United States Patent
Huang et al.

(10) Patent No.: US 7,865,941 B2
(45) Date of Patent: Jan. 4, 2011

(54) SYSTEM AND METHOD FOR CONTROLLING AN AUTHORIZATION PROCEDURE OF A TASK

(75) Inventors: Chegn-Yi Huang, Taipei Hsien (TW); Xin-Yu Huang, Shenzhen (CN); Zhe-Xin Liu, Shenzhen (CN); Wen-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 1090 days.

(21) Appl. No.: 11/558,477

(22) Filed: Nov. 10, 2006

(65) Prior Publication Data
US 2007/0174902 A1    Jul. 26, 2007

(30) Foreign Application Priority Data
Jan. 24, 2006    (CN)    .................. 2006 1 0033477

(51) Int. Cl.
*G06F 7/04* (2006.01)

(52) U.S. Cl. ................. 726/5; 726/17; 726/21; 726/27

(58) Field of Classification Search ............. 726/5, 726/17, 21, 27
See application file for complete search history.

(56) References Cited

U.S. PATENT DOCUMENTS

| | | | |
|---|---|---|---|
| 6,237,096 B1* | 5/2001 | Bisbee et al. | 713/178 |
| 6,591,300 B1* | 7/2003 | Yurkovic | 709/226 |
| 6,959,382 B1 | 10/2005 | Kinnis | |
| 6,970,842 B1* | 11/2005 | Ashby | 705/38 |
| 2003/0046422 A1* | 3/2003 | Narayanan et al. | 709/238 |
| 2005/0182956 A1* | 8/2005 | Ginter et al. | 713/193 |
| 2005/0257045 A1* | 11/2005 | Bushman et al. | 713/156 |
| 2006/0129443 A1* | 6/2006 | Chen et al. | 705/8 |

\* cited by examiner

*Primary Examiner*—Kambiz Zand
*Assistant Examiner*—Amare Tabor
(74) *Attorney, Agent, or Firm*—Wei Te Chung

(57) ABSTRACT

A system for controlling an authorization procedure of a task according to a preferred embodiment is provided. The system includes: a database server for storing data about a task to be authorized; and an application server for obtaining basic information of the task to be authorized, configuring an authorization procedure for the task, designating an authorizer for each step of the authorization procedure, and controlling the whole authorization procedure.

12 Claims, 3 Drawing Sheets

US 7,865,941 B2

SYSTEM AND METHOD FOR CONTROLLING AN AUTHORIZATION PROCEDURE OF A TASK

BACKGROUND OF THE INVENTION

1. Field of the Invention

The present invention relates to authorization methods, especially to a system and method for controlling an authorization procedure of a task.

2. Description of Related Art

Authorization tasks are very common and frequent tasks in daily life or daily work, especially in enterprises. Every day, people sign their names on request sheets, credit card receipts, and other documents, demonstrating they are in agreement of the contents.

Adding authorization information to documents or messages can be extremely tedious due to numerous manual tasks involved. For example, a typical procedure for authorizing a document may include: obtaining the document from a preparer of the document, determining the number of authorizers, delivering the document from one authorizer to another for authorization, and informing the preparer of the authorization information at last.

The above process is also inefficient, as user error may result in a processing delay or even a security breach.

What is needed, therefore, is a system and method for controlling authorization procedures of tasks, so as to reduce manual work and improve processing efficiency.

SUMMARY OF THE INVENTION

A system for controlling an authorization procedure of a task according to a preferred embodiment is provided. The system includes: a database server for storing data about a task to be authorized; and an application server for obtaining basic information of the task to be authorized, configuring an authorization procedure for the task, designating an authorizer for each step of the authorization procedure, and controlling the whole authorization procedure.

Another preferred embodiment provides a method for controlling an authorization procedure of a task. The method includes the steps of: (a) obtaining basic information of a task to be authorized from a database; (b) configuring an authorization procedure for the task, and designating an authorizer for each step of the authorization procedure, based on the basic information of the task and employee information of an enterprise stored in the database; (c) informing the first authorizer to authorize the task; (d) authenticating whether the authorizer's identification is valid; (e) determining whether the authorizer has authorized the task before a deadline; (f) recording authorization information of the task, if the authorizer has authorized the task; (h) informing a next authorizer to authorize the task, if any authorizer has not authorized the task; and (i) repeating from the authenticating step until all the signers have authorized the task.

Other objects, advantages and novel features of the present invention will be drawn from the following detailed description of the preferred embodiment and preferred method of the present invention with the attached drawings.

DETAILED DESCRIPTION OF THE PREFERRED EMBODIMENT

Figure 1:
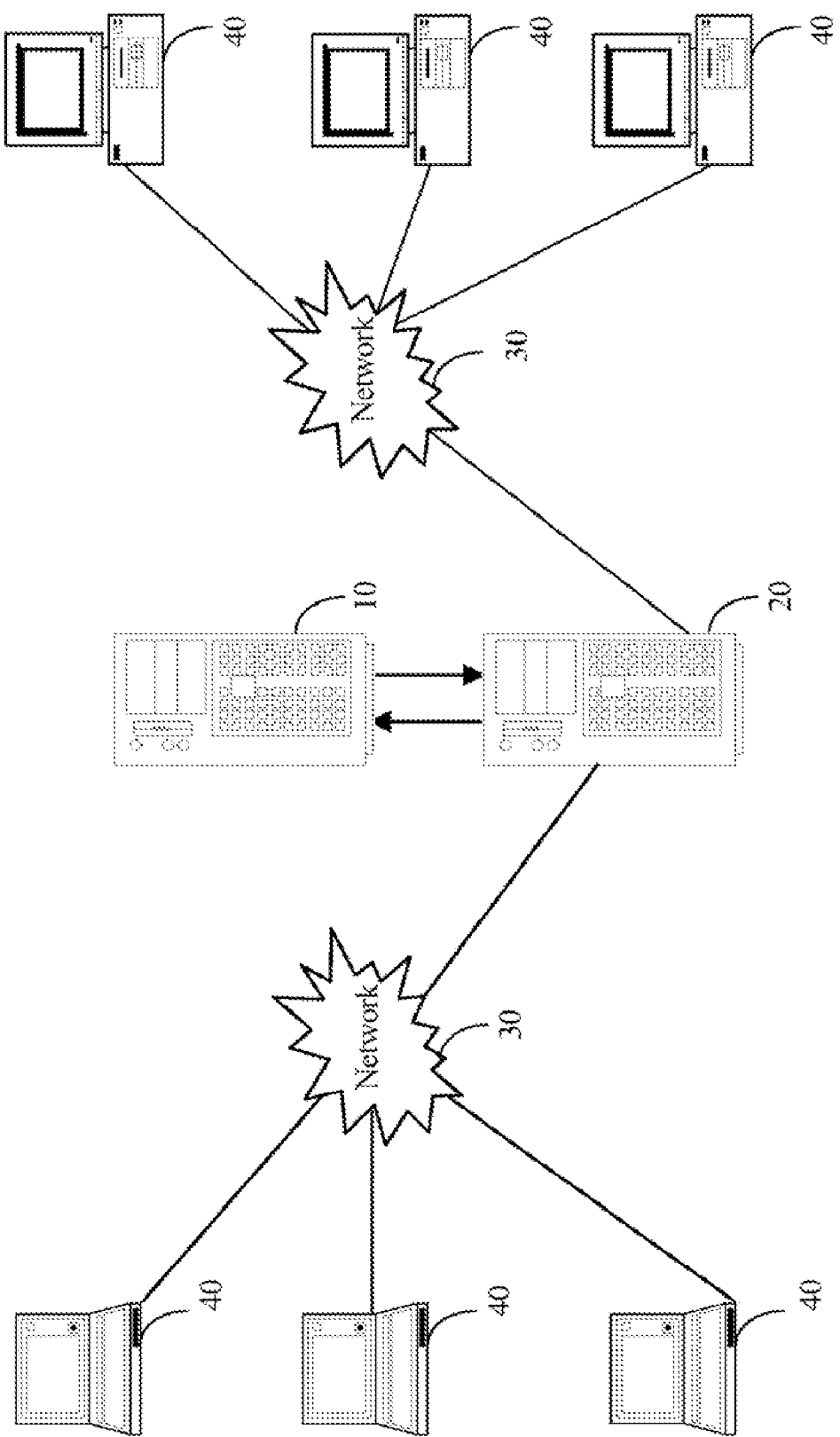
FIG. 1 a schematic diagram illustrating a system for controlling an authorization procedure of a task according to a preferred embodiment.

FIG. 1 is a schematic diagram illustrating a system for controlling an authorization procedure of a task according to a preferred embodiment. The system includes a database 10, an application server 20, a network 30, and a plurality of distributed client computers 40 (only six shown).

The database 10 is used for storing data used or generated by the system, such data include basic information of tasks to be authorized, employee information of an enterprise, authorization procedures of the tasks, authorization records of the tasks, and digital certificate information of the employees of the enterprise, and so on. Each authorization procedure of the task may be constituted by one authorization step or a series of authorization steps. Each authorization step corresponds to an authorization lever and one authorizer. Basic information of each task mainly includes: a task number, detailed contents (such as a document) of the task, and related departments and members of the task. The employee information of the enterprise provides information of each member in the enterprise, such as a name, an employee ID, a department, a post, and contact information of each member.

The application server 20 is used for configuring the authorization procedures for the tasks, designating an authorizer for each step of each authorization procedure, and controlling an entire task authorization process.

The plurality of client computers 40 are at different locations, and are connected to the application server 20 through the network 30. Each client computer 40 provides a user interface for each of the authorizer to authorize the tasks, and for receiving all kinds of notices regarding the authorization procedures sent by the application server 20.

Figure 2:
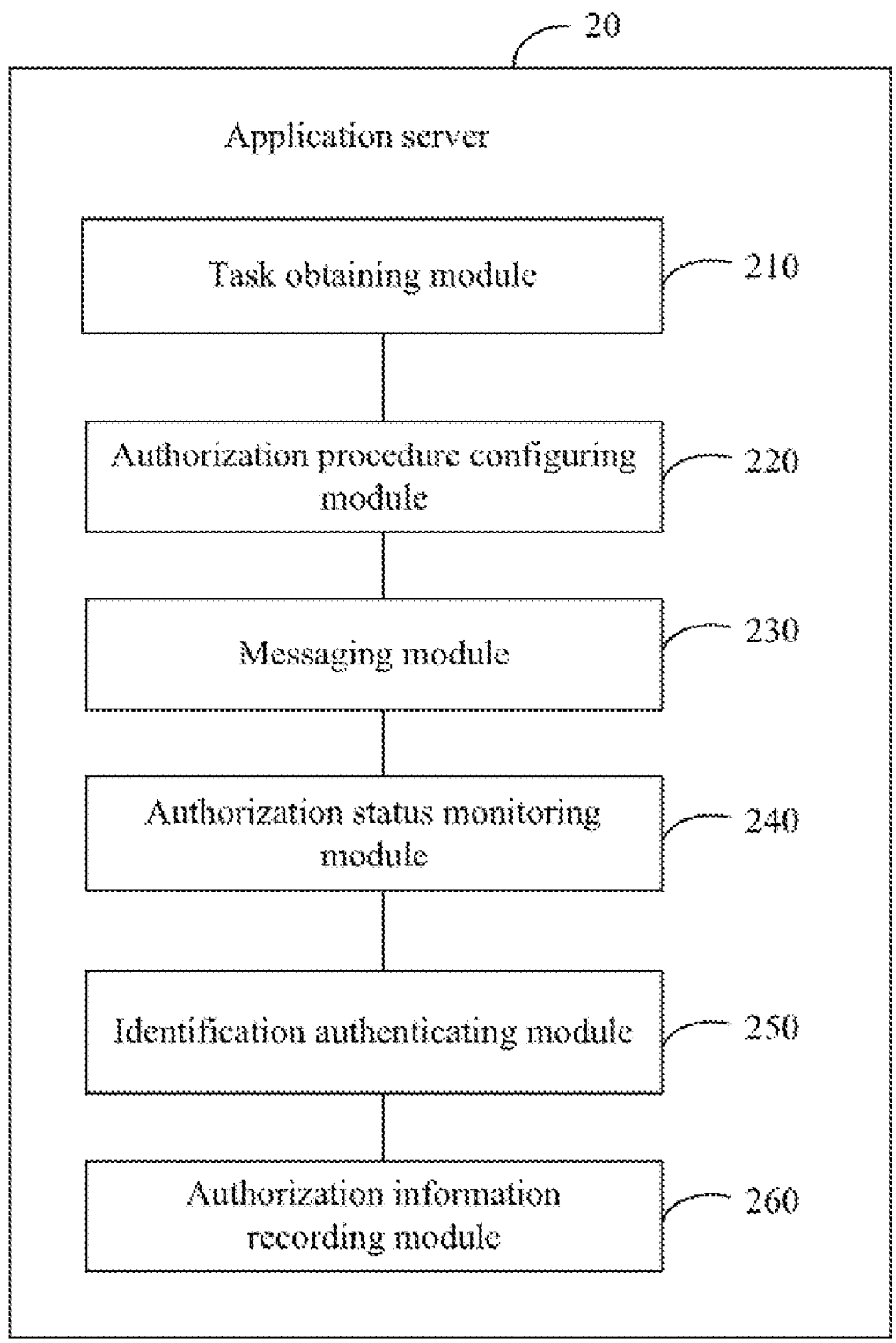
FIG. 2 is a block diagram illustrating function modules of an application server in FIG. 1.

FIG. 2 is a block diagram illustrating function modules of the application server 20 in FIG. 1. The application server 20 includes: a task obtaining module 210, an authorization procedure configuration module 220, a messaging module 230, an authorization status monitoring module 240, an identification authenticating module 250, and an authorization information recording module 260.

The task obtaining module 210 is used for obtaining basic information of a task to be authorized from the database 10.

The authorization procedure configuration 220 is used for configuring an authorization procedure for the task, and designating an authorizer for each step of the authorization procedure based on the basic information of the task and the employee information of the enterprise.

The messaging module 230 is used for informing each authorizer to authorize the task according to the contact information of the authorizer.

The authorization status monitoring module 240 is used for monitoring authorization status of each step of the authorization procedure. The authorization status includes: unread, read, unauthorized, and authorized. For example, if an authorizer corresponds to one step of the authorization procedure has read the detailed contents of the task but has not authorized the task, the step of the authorization procedure is in a read and unauthorized status.

The identification authenticating module 250 is used for authenticating identification of each authorizer based on digital certificate information of the authorizer. If an authorizer has no certificate, or if the digital certificate information of the authorizer is not identical with corresponding digital certificate information stored in the database 10, the authorizer will be rejected to authorize the task.

The authorization information recording module 260 is used for recording all authorization information of the task, such authorization information includes: entry information of each authorizer, authorization status of each step of the authorization procedure, and authorization opinion of each authorizer such as "agree" or "disagree".

Figure 3:
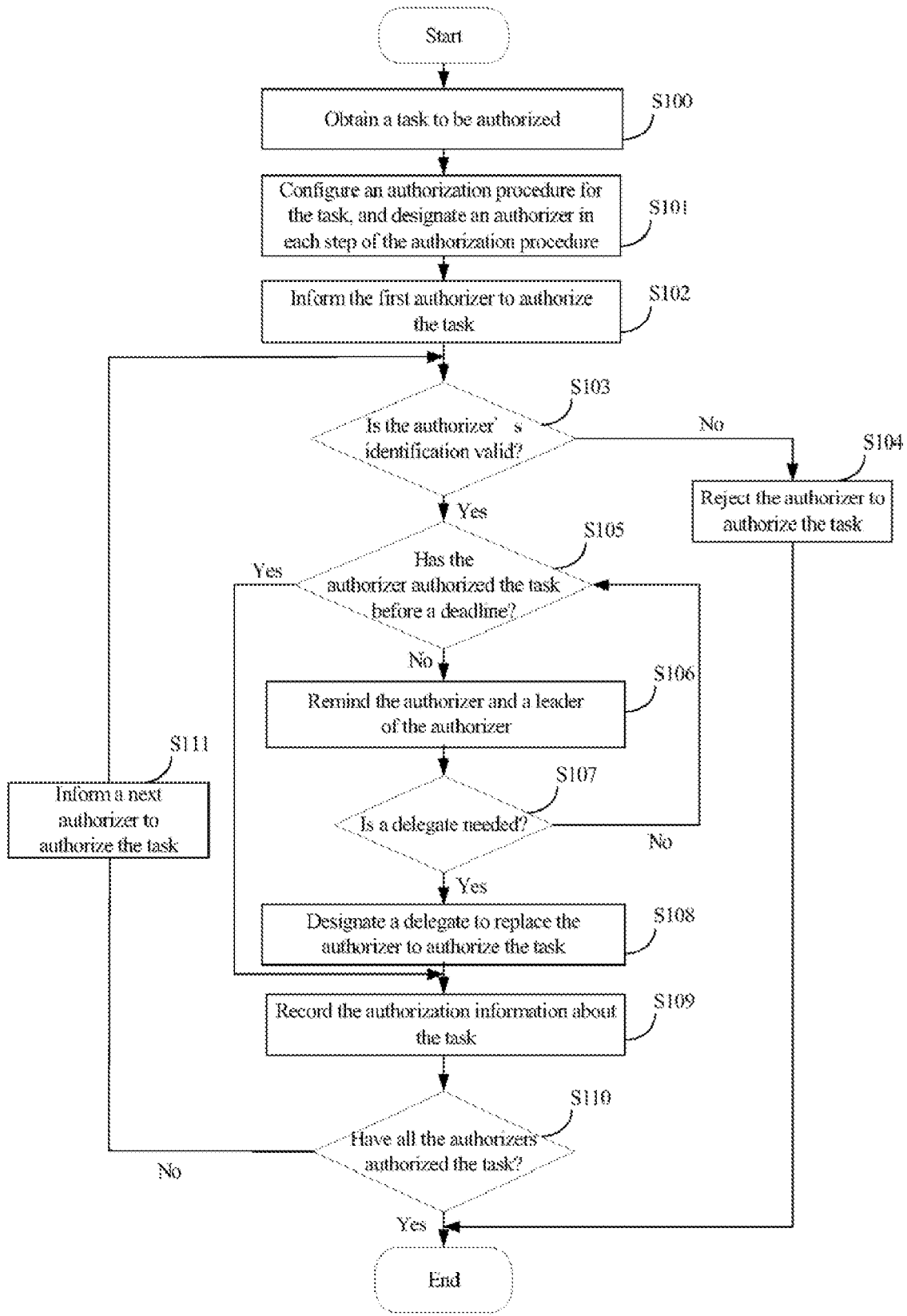
FIG. 3 is a flowchart of a preferred method for controlling an authorization procedure of a task.

FIG. 3 is a flowchart of a preferred method for controlling a authorization procedure of a task. Firstly, in step S100, the task obtaining module 210 obtains basic information of a task to be authorized from the database 10. The basic information about the task may include: a task ID, detailed contents (such as a document) of the task, and related departments and members of the task.

In step S101, the authorization procedure configuration module 220 configures an authorization procedure for the task and designates an authorizer in each step of the authorization procedure based on the basic information of the task and employee information of the enterprise stored in the database 10. The employee information of the enterprise provides information of each member in the enterprise, such as a name, an employee ID, a department, a post, a rank, and contact information. In step S101, the authorization procedure configuration module 220 further sets a deadline for each authorizer to authorize the task. In step S102, the messaging module 230 informs the first authorizer to authorize the task, and the authorization status monitoring module 240 begins to monitor the authorization status of each step in the authorization procedure.

In step S103, when a user at one of the client computers 40 logs into the application server 20 to authorize the task, the identification authenticating module 250 authenticates whether identification of the user is valid according to digital certificate information of the authorizer. If the user has no digital certificate, or the digital certificate information of the authorizer is not identical with corresponding certificate information stored in the database 10, that means the identification of the user is invalid, in step S104, the identification authenticating module 250 rejects the user to authorize the task.

If, in step S103, the identification authenticating module 250 detects that the identification of the user is valid, the user is permitted to authorize the task.

In step S105, the procedure status monitoring module 240 checks whether the authorizer has authorized the task before the deadline. If the authorizer has authorized the task before the deadline, the procedure goes directly to step S109 described below. Otherwise, if the authorizer has not authorized the task before the deadline, in step S106, the procedure status monitoring module 240 reminds the authorizer to authorize the task, and reminds a leader of the authorizer by e-mail or any other suitable contact means.

In step S107, the procedure status monitoring module 240 detects whether a delegate is needed. If no delegate is needed, the procedure returns to step S105 described above. Otherwise, if the authorizer cannot authorize the task before the deadline, for example, the authorizer is on a business trip or on a vacation, and the procedure status monitoring module 240 may receive delegate requirement information from the authorizer or the leader of the authorizer. Then, in step S108, the authorization procedure configuration module 220 designates a delegate to replace the authorizer to authorize the task according to the delegate requirement information. In step S109, the authorization information recording module 260 records authorization information of the authorizer or the delegate, such authorization information may include: entry information of each authorizer (or delegate), authorization status of each step of the authorization procedure, and authorization opinion of each authorizer (or delegate) such as "agree" or "disagree".

In step S110, the authorization status monitoring module 240 checks whether all the authorizers have authorized the tasks. If any authorizer has not authorized the task, in step S111, the messaging module 230 informs a next authorizer to authorize the task, and the procedure goes to step S103 for a next circulation.

If, in step S110, the authorization status monitoring module 240 determines that all the authorizers have authorized the task, the procedure ends.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for controlling an authorization procedure of a task, comprising:
 a database server for storing basic information of a task to be authorized, and employee information of an enterprise; and
 an application server comprising:
 a task obtaining module for obtaining the basic information of the task to be authorized from the database server, wherein the basic information of the task comprises a task number, detailed contents of the task, and related departments and members of the task;
 an authorization procedure configuring module for configuring an authorization procedure for the task, wherein the authorization procedure is constituted by one or a series of authorization steps, and designating an authorizer for each step of the authorization procedure based on the basic information of the task and the employee information;
 a messaging module for informing each authorizer in each step of the authorization procedure to authorize the task; and
 an authorization status monitoring module for monitoring an authorization status of each step of the authorization procedure.

2. The system as claimed in claim 1, wherein the application server further comprises an identification authenticating module for authenticating identification of each authorizer according to digital certificate information of the authorizer.

3. The system as claimed in claim 1, wherein the application server further comprises an authorization information recording module for recording all the authorization information about the task.

4. The system as claimed in claim 1, wherein the authorization procedure configuring module is further used for presetting a deadline for each authorizer to authorize the task.

5. The system as claimed in claim 4, wherein the authorization procedure configuring module is further used for designating a delegate for an authorizer to authorize the task if the authorizer cannot authorize the task before the deadline.

6. The system as claimed in claim 4, wherein the messaging module is further used for reminding an authorizer and a leader of the authorizer if the authorizer has not authorized the task before a corresponding deadline.

7. The system as claimed in claim 1, wherein the authorization status of each step of the authorization procedure comprises read, unread, authorized, or unauthorized.

8. A computer-based method for controlling an authorization procedure of a task, comprising the steps of:
- obtaining basic information of a task to be authorized and employee information of an enterprise from a database server, wherein the basic information of the task comprises a task number, detailed contents of the task, and related departments and members of the task;
- configuring an authorization procedure for the task, wherein the authorization procedure of the task is constituted by one or a series of authorization steps, and designating an authorizer for each step of the authorization procedure, based on the basic information of the task and the employee information;
- informing the first authorizer to authorize the task;
- authenticating whether the authorizer's identification is valid;
- monitoring an authorization status of each step of the authorization procedure to determine whether the authorizer has authorized the task before a deadline;
- recording authorization information of the task, if the authorizer has authorized the task before the deadline;
- checking whether all the authorizers have authorized the task;
- informing a next authorizer to authorize the task, if any authorizer has not authorized the task; and
- repeating from the authenticating step until all the signers have authorized the task.

9. The method as claimed in claim 8, further comprising the step of:
- rejecting the authorizer to authorize the task, if the identification of the authorizer is invalid.

10. The method as claimed in claim 8, further comprising the step of:
- setting the deadline for each authorizer to authorize the task.

11. The method as claimed in claim 9, further comprising the steps of:
- reminding the authorizer and a leader of the authorizer, if the authorizer has not authorized the task before the deadline; and
- determining whether a delegate is needed;
- designating a delegate to replace the authorizer to authorize the task, if a delegate is needed; and
- going to the recording step.

12. The method as claimed in claim 8, wherein the authorization status of each step of the authorization procedure comprises read, unread, authorized, or unauthorized.

* * * * *